US007750945B2

(12) United States Patent
Serizawa et al.

(10) Patent No.: US 7,750,945 B2

(45) Date of Patent: Jul. 6, 2010

(54) VIDEO SIGNAL PROCESSING DEVICE AND IMAGE PROCESSING DEVICE

(75) Inventors: Masayuki Serizawa, Tokyo (JP); Kenji Tabei, Kanagawa (JP)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 11/568,775

(22) PCT Filed: Oct. 11, 2005

(86) PCT No.: PCT/JP2005/018676

§ 371 (c)(1),
(2), (4) Date: Nov. 7, 2006

(87) PCT Pub. No.: WO2006/041049

PCT Pub. Date: Apr. 20, 2006

(65) Prior Publication Data

US 2007/0222866 A1 Sep. 27, 2007

(30) Foreign Application Priority Data

Oct. 13, 2004 (JP) ............................ 2004-299149

(51) Int. Cl.
*H04N 5/235* (2006.01)
*H04N 5/228* (2006.01)
*H04N 5/208* (2006.01)

(52) U.S. Cl. .................................... 348/221.1; 348/252

(58) Field of Classification Search ................. 348/252, 348/345–357

See application file for complete search history.

(56) References Cited

U.S. PATENT DOCUMENTS 5,303,059 A * 4/1994 Kim ............................ 386/93
5,374,995 A 12/1994 Loveridge et al.
7,167,203 B1 * 1/2007 Yukawa et al. .............. 348/357
7,292,280 B2 * 11/2007 Yamazaki et al. ........... 348/363
2002/0080261 A1 * 6/2002 Kitamura et al. ............ 348/349

(Continued)

FOREIGN PATENT DOCUMENTS

EP 0 477 884 A2 4/1992

(Continued)

OTHER PUBLICATIONS

International Search Report dated Dec. 19, 2005.

(Continued)

*Primary Examiner*—Sinh Tran
*Assistant Examiner*—Christopher K Peterson
(74) *Attorney, Agent, or Firm*—Pearne & Gordon LLP

(57) ABSTRACT

It is an object of the present invention to provide a video signal processing device, which can produce a digital video signal, excellent in image quality, fully utilizing effective picture elements of the imaging element, without performing a special control of an imaging element driving unit.

In accordance with a contour correction gain calculated based on a compression ratio detecting signal outputted from an image compressing unit 21, a contour correction unit 22 can carry out a contour correction on a compressed image. Accordingly, an NTSC/PAL encoder 24 can output a preferable video signal, which has been subjected to an appropriate contour correction. Moreover, a digital outputting unit 25 outputs an uncompressed video signal, and therefore can provide a preferable video signal without deteriorating the effective picture elements of an imaging element.

8 Claims, 12 Drawing Sheets

U.S. PATENT DOCUMENTS

2004/0183927 A1 9/2004 Hirakoso

FOREIGN PATENT DOCUMENTS

| | | | | |
|---|---|---|---|---|
| EP | 1 011 264 | A1 | | 6/2000 |
| JP | 03 030579 | A | | 2/1991 |
| JP | 0423572 | A | | 1/1992 |
| JP | 11122511 | A | * | 4/1999 |
| JP | 2000308076 | | | 2/2000 |
| JP | 200124975 | A | | 1/2001 |
| JP | 200277667 | A | | 3/2002 |
| JP | 200277724 | A | | 3/2002 |
| JP | 2002077724 | A | * | 3/2002 |
| WO | 02-37835 | A2 | | 5/2002 |

OTHER PUBLICATIONS

European Search Report for corresponding European Patent Application No. EP 05 79 3703.

* cited by examiner

VIDEO SIGNAL PROCESSING DEVICE AND IMAGE PROCESSING DEVICE

TECHNICAL FIELD OF THE INVENTION

The present invention relates to a video signal processing device having an imaging element such as, for example, a CCD, and more particularly to an image processing device which carries out an image format conversion on a video signal.

DESCRIPTION OF THE RELATED ART

A video camera is, in general, designed to pick up an image using a solid-state imaging element such as, for example, a CCD, convert the image into a digital video signal, and carry out various kinds of digital processing on the digital video signal to have the digital video signal converted into image data in a predetermined image format, and outputted therethrough.

Some imaging device having a function of taking a still image, such as, for example, a digital still camera, comprises an imaging element greater in the number of picture elements (pixels) than that of a commonly used NTSC/PAL video camera, or the like, in order to improve the resolution.

As for an imaging device such as, for example, a digital still camera, which gives greater importance to the resolution of the still image, it's often the case that it comprises an imaging element greater in both the number of picture elements aligned along the horizontal direction and the number of picture elements aligned along the vertical direction than that of a commonly used NTSC/PAL video camera, or the like, manufactured for taking moving images.

In recent years, it is anticipated that the imaging device such as, for example, an NTSC/PAL video camera, for taking moving images, will employ an imaging element manufactured for taking a still image, for the purpose of improving the image quality.

An imaging device such as, for example, a single-panel video camera, encounters a drawback in that a spatial sampling frequency of a color signal of the single-panel video camera is reduced to less than half the number of the spatial sampling frequency of the picture elements of the imaging element, and thus aliasing noise may occur while, on the other hand, an imaging device such as, for example, a three-panel video camera is the same in a spatial sampling frequency of each of three primary colors R, G, and B, as the picture elements of the imaging element, and thus can prevent aliasing nose from occurring, thereby ensuring to generate a video signal of high quality.

The three-panel video camera encounters another drawback in that the three-panel video camera is complex in construction, thus makes it difficult for the three-panel video to be reduced in size, and expensive in cost in comparison with the single-panel video camera, because of the fact that the three-panel video camera comprises three solid-state imaging elements such as, for example, CCDs, and the like. This results in great demand for the single-panel video camera.

It is therefore considered to make an imaging device such as, for example, a single-panel video camera having an imaging element designed for taking a still image for the purpose of improving the image quality equivalent to that of the three-panel video camera.

FIG. 13 is a block diagram showing a conventional imaging device having an imaging element designed for taking a still image.

As clearly shown in FIG. 13, the conventional imaging device comprises an imaging element 2 for converting a light into an electric signal, an A/D converting circuit 3 for converting an analog video signal outputted from the imaging element 2 into a digital video signal, a signal processing circuit 4 for processing the digital video signal in a way of, for example, a gamma correction frequently used for a camera, to produce a video signal such as, for example, an NTSC/PAL video signal, an imaging element driving unit 5 for driving the imaging element 2, and a controlling unit 6 for controlling the imaging element driving unit 5.

In the conventional imaging device thus constructed, the imaging element driving unit 5 is controlled by the controlling unit 6 to drive the imaging element 2 having image data for the amount of 480 lines per field, which is twice as much as that produced by the NTSC method, to have the imaging element 2 generate and output the image data for 240 lines per field, and the image data outputted by the imaging element 2 is converted by the A/D converting circuit 3 into a digital video signal, and processed by the signal processing circuit 4 to produce image data in conformance with the NTSC method (see, for example, Patent Document 1).

Patent Document 1: Japanese Patent Laid-Open Publication 2000-308076

DISCLOSURE OF THE INVENTION

Problems to be Solved

The conventional imaging device, however, encounters another drawback in that the effective picture elements of the imaging element cannot be fully utilized although the imaging element having a large number of picture elements is used and thus image data of high resolution is obtained, resulting from the fact that the driving unit driving the imaging element is controlled in conformable with an analog image format such as, for example, the NTSC, or the like, and the number of vertical lines outputted from the imaging element thus become approximately 240. This leads to the fact that the image data of high quality, fully utilizing all the number of effective picture elements of the imaging element, cannot be obtained, in addition to the analog image data conformable with, for example, the NTSC, or the like.

Further, the conventional imaging device, however, encounters another drawback in that a driving circuit is required for each of the additional imaging elements, thereby being poor in versatility and increased in costs.

The present invention is made to solve the foregoing drawbacks and it is an object of the present invention to provide a video processing device, which can output a digital video signal, excellent in image quality, fully utilizing effective picture elements of the imaging element, as well as image data down-converted in conformable with, for example, the NTSC, or the like, while enhancing the down-converted image data in image quality.

Means of Solving the Problems

According to a first aspect of the present invention, there is provided a video signal processing device, comprising: image data generating means for converting a video signal inputted from an imaging element into image data based on effective pixels, viz. picture elements contained in the video signal; image compression means for compressing the image data at a predetermined compression ratio; contour correction means for carrying out a contour correction on the image data compressed by the image compression means in accordance with a contour correction gain, to output a corrected video signal; and contour correction gain calculating means for calculating the contour correction gain on the basis of the compression ratio at which the image compression means compressed the image data.

The video signal processing device thus constructed as previously mentioned can output image data, on which contour correction has been appropriately carried out, making maximum use of the functions of the imaging element, and excellent in image quality, resulting from the fact that the contour correction is carried out in accordance with the compression ratio, fully utilizing all the number of effective picture elements of the imaging element.

The video signal processing device according to the present invention may further comprise brightness signal level detecting means for detecting a brightness signal level of the image data compressed by the image compression means, and the contour correction gain calculating means may calculate the contour correction gain on the basis of the brightness signal level detected by the brightness signal level detecting means, in addition to the compression ratio at which the image compression means compressed the image data.

The video signal processing device thus constructed as previously mentioned can carry out a correction in accordance with the brightness signal level, and thus mitigate a feeling of strangeness arisen as a result of the contour correction or increase in the signal-noise ratio, resulting from the fact that the contour correction is carried out in accordance with the brightness signal level.

Further, the video signal processing device may comprise image frequency component detecting means for detecting frequency components of the image data compressed by the image compression means, and in which the contour correction gain calculating means may calculate the contour correction gain on the basis of the frequency components of the image data detected by the image frequency component detecting means, in addition to the compression ratio at which the image compression means compressed the image data.

The video signal processing device thus constructed as previously mentioned can carry out a contour correction in accordance with the frequency components, and thus the contour correction can be carried out appropriately in accordance with the image contents, for example, the amount of sharp-pointed image elements, resulting from the fact that the contour correction is carried out in accordance with the frequency components.

Further, in the aforementioned video signal processing device according to the present invention, the image frequency component detecting means may comprise a low frequency brightness average calculating unit for calculating a low frequency brightness average of the compressed image data, a high frequency brightness average calculating unit for calculating a high frequency brightness average of the compressed image data, and a gain control signal generating unit for comparing the brightness average calculated by the low frequency brightness average calculating unit and the high frequency brightness average calculated by the high frequency brightness average calculating unit, generating a gain control signal used to decrease the contour correction gain when it is judged that the low frequency brightness average is greater than the high frequency brightness average but lower than a predetermined low frequency brightness reference value, generating a gain control signal used to increase the contour correction gain when it is judged that the high frequency brightness average is greater than both the low frequency brightness average and greater than a predetermined high frequency brightness reference value, and outputting the gain control signal to the contour correction gain calculating means.

The video signal processing device thus constructed as previously mentioned can carry out a contour correction in accordance with the frequency components, and thus the contour correction can be carried out appropriately in accordance with the image contents, for example, the amount of sharp-pointed image elements, resulting from the fact that the image data is regarded as having relatively large amount of low frequency components, viz., relatively large amount of smooth picture elements, and thus the gain control signal used to decrease the contour correction gain is generated when it is judged that the low frequency brightness average is greater than the high frequency brightness average but lower than a predetermined low frequency brightness reference value, and the image data is, on the other hand, regarded as having relatively large amount of high frequency components, viz., relatively large amount of sharp picture elements, and thus the gain control signal used to increase the contour correction gain is generated when it is judged that the high frequency brightness average is greater than both the low frequency brightness average and greater than a predetermined high frequency brightness reference value, and outputting the gain control signal to the contour correction gain calculating means.

Further, the aforementioned video signal processing device may comprise digital network band detecting means for detecting a band of a network, which transmits the corrected video signal, and the contour correction gain calculating means may calculate the contour correction gain on the basis of the band of the network detected by the network band detecting means, in addition to the compression ratio at which the image compression means compressed the image data.

The video signal processing device thus constructed as previously mentioned can carry out a contour correction appropriately in accordance with the transmission situation of the video signal, and thus the contour correction can be carried out appropriately in accordance with the image to be transmitted, resulting from the fact that the contour correction is carried out in accordance with the band of the network.

Further, the aforementioned video signal processing device may comprise a digital image outputting unit for outputting the image data generated by the image data generating means.

The video signal processing device thus constructed can provide a video signal, excellent in image quality, having no loss in the effective picture elements of the imaging element, resulting from the fact that an uncompressed video signal can be outputted in addition to the video signal, which has been subjected to an appropriate contour correction, and is excellent in image quality.

Further, the video signal processing device may comprise: digital brightness signal level detecting means for detecting a brightness signal level of the image data outputted from the digital image outputting unit, digital contour correction means for carrying out a contour correction on the image data outputted from the digital image outputting unit in accordance with a contour correction gain, to output a corrected video signal; and digital contour correction gain calculating means for calculating the contour correction gain on the basis of the brightness signal level calculated by the digital brightness signal level detecting means.

The video signal processing device thus constructed can output an uncompressed video signal further improved in the signal-to-noise ratio, in addition to the video signal, which has been subjected to an appropriate contour correction, and is excellent in image quality, resulting from the fact that the contour correction is carried out on the image data outputted from the digital image outputting unit in accordance with the brightness signal level.

Further, the video signal processing device may comprise digital image frequency component detecting means for detecting frequency components of the image data outputted from the digital image outputting unit, and the digital contour correction gain calculating means may calculate the contour correction gain on the basis of the frequency components of the image data detected by the digital image frequency component detecting means, in addition to the brightness signal level calculated by the digital brightness signal level detecting means.

The video signal processing device thus constructed can output an uncompressed video signal, on which the contour correction has been carried out appropriately in accordance with the image contents, for example, the amount of sharp-pointed image elements, in addition to the video signal, which has been subjected to an appropriate contour correction, and is excellent in image quality, resulting from the fact that the contour correction is carried out on the image data outputted from the digital image outputting unit in accordance with the frequency components.

Further, the video signal processing device may comprise digital network band detecting means for detecting a band of a network, which transmits the corrected video signal, and the contour correction gain calculating means may calculate the contour correction gain on the basis of the band of the network detected by the network band detecting means, in addition to the brightness signal level calculated by the digital brightness signal level detecting means.

The video signal processing device thus constructed as previously mentioned can carry out a contour correction appropriately in accordance with the transmission situation of the video signal, and thus the contour correction can be carried out appropriately in accordance with the image to be transmitted, resulting from the fact that the contour correction is carried out on the data outputted from the digital image outputting unit in accordance with the band of the network.

In accordance with a second aspect of the present invention, there is provided an image processing device, comprising the aforementioned video signal processing device and image processing means for carrying out an image processing based on the video signal generated by the video signal processing device.

The image processing device according to the present invention thus constructed as previously mentioned can carry out an image processing such as, for example, a person authentication processing of extracting contour components of the image data, with high accuracy, resulting from the fact that the image processing can be carried out on the video signal outputted from the video signal processing device.

EFFECT OF THE INVENTION

The present invention can provide a video signal processing device which is operative to generate image data fully utilizing effective picture elements of the imaging element, and carry out a contour correction on the image data in accordance with a compression ratio, thereby having an effect of outputting image data, on which contour correction has been appropriately carried out, taking full advantage of functions of the imaging element, and excellent in image quality.

EXPLANATION OF THE REFERENCE NUMERALS

Figure 1:
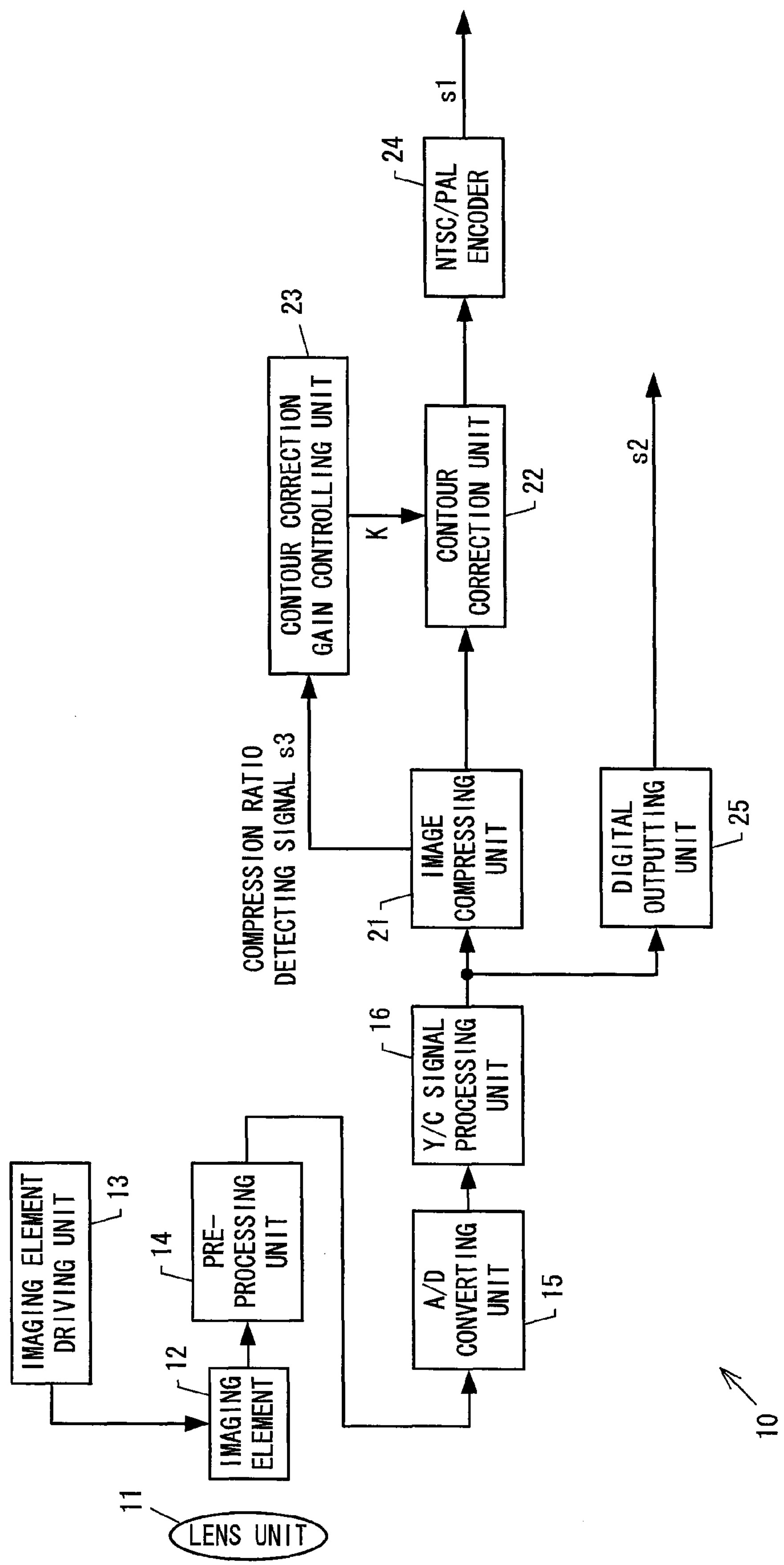
FIG. 1 is a block diagram showing a first preferred embodiment of a video signal processing device according to the present invention.

2 imaging element
3 A/D converting circuit
4 signal processing circuit
5 imaging element driving unit
6 controlling unit
10,30,40,70 video signal processing device
11 lens unit
12 imaging element
13 imaging element driving unit
14 pre-processing unit
15 A/D converting unit
16 Y/C signal processing unit
21 image compressing unit
22 contour correction unit
23 contour correction gain controlling unit
24 NTSC/PAL encoder
25 digital outputting unit
31 contour correction unit
32 brightness signal level detecting and controlling unit
33 weighting unit
41 contour correction unit
42 video signal band detecting unit
43 weighting unit
51 contour correction unit
52 brightness signal level detecting and controlling unit
53 video signal band detecting unit
54 weighting unit 61 low frequency component BPF
62 low frequency component brightness average calculating unit
63 high frequency component BPF
64 high frequency component brightness average calculating unit
65 gain controlling unit
71 contour correction unit
72 network I/F controlling unit
73 weighting unit
80 image signal processing device
81 image processing unit

DESCRIPTION OF THE PREFERRED EMBODIMENTS

The following description will be directed to a plurality of preferred embodiments of video signal processing device and an image processing device according to the present invention with reference to the drawings.

First Preferred Embodiment

Referring to FIG. 1 of the drawings, there is shown a first preferred embodiment of the video signal processing device according to the present invention.

As clearly shown in FIG. 1, the video signal processing device 10 comprises a lens unit 11 for condensing light to have the light properly focused, an imaging element 12 for converting the light condensed by the lens unit 11 into an electric signal, a imaging element driving unit 13 for driving the imaging element 12, a pre-processing unit 14 for carrying out an pre-processing on an analog video signal outputted from the imaging element 12, in order to be later A/D converted, an A/D converting unit 15 for converting a signal outputted from the pre-processing unit 14 into a digital signal, a Y/C signal processing unit 16 for carrying out a brightness signal processing and a color-difference signal processing on a video signal outputted from the A/D converting unit 15, an image compressing unit 21 for compressing the video signal, a contour correction unit 22 for carrying out a contour correction on a compressed video signal outputted from the image compressing unit 21 based on a contour correction gain, a contour correction gain controlling unit 23 for outputting a control signal to control the contour correction gain used by the contour correction unit 22, an NTSC/PAL encoder 24 for generating an analog video signal s1 on the basis of a video signal outputted from the contour correction unit 22, and a digital outputting unit 25 for carrying out an I (interlace)/P(progressive) conversion, or the like on the video signal outputted from the Y/C signal processing unit 16 to generate a digital video signal s2.

The lens unit 11, the imaging element 12, the imaging element driving unit 13, the pre-processing unit 14, the A/D converting unit 15, and the Y/C signal processing unit 16 collectively constitute image data generating means.

The pre-processing unit 14 includes a CDS circuit for removing reset noise from the analog video signal outputted from the imaging element 12, an AGC circuit for adjusting amplitude of a signal outputted from the CDS circuit after the noise component is removed to have the analog video signal maintain a certain signal level, and a clamp circuit for clamping a signal whose amplitude is thus adjusted, in order to be later A/D converted.

The image compressing unit 21 is designed to compress the video signal outputted from the Y/C signal processing unit 16 at a compression ratio, as well as output the compression ratio as a compression ratio detecting signal s3. The contour correction gain controlling unit 23 is designed to generate and output a control signal to control the contour correction gain used by the contour correction unit 22, on the basis of the compression ratio detecting signal s3 outputted from the image compressing unit 21.

The description hereinlater will be directed to a down-convert processing of shrinking an image format along a vertical direction with the assumption that the imaging element 12 is driven by the imaging element driving unit 13 by way of interlace method.

Figure 2:
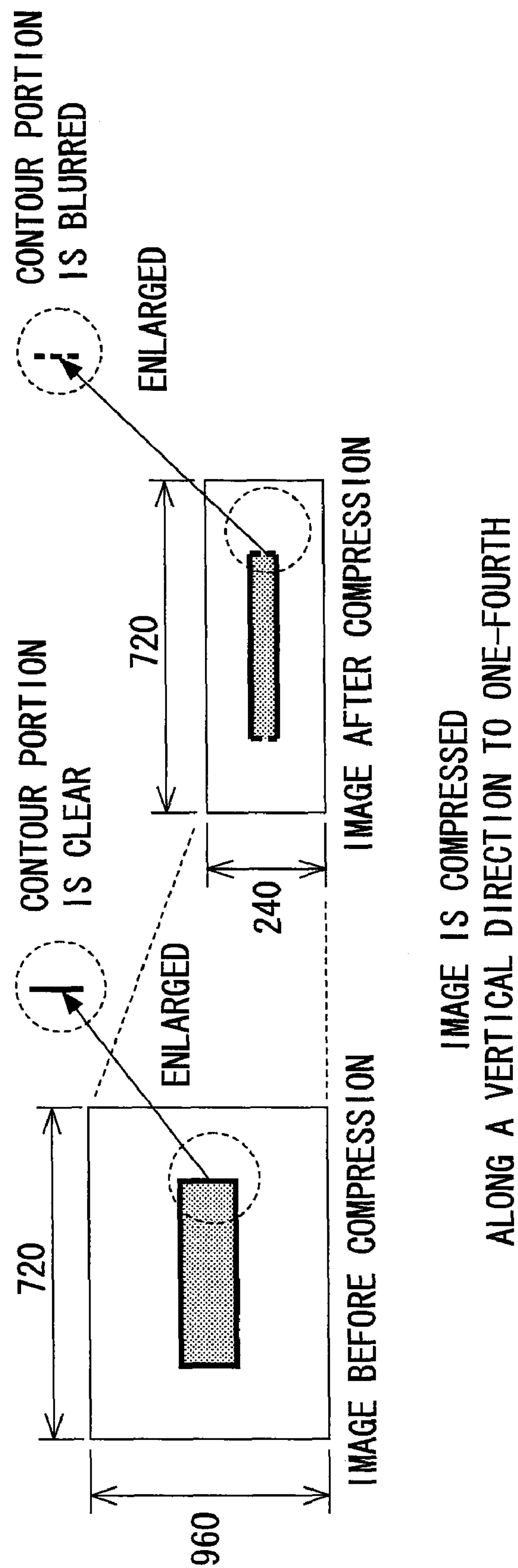
FIG. 2 is a view explaining a contour portion displayed based on image data simply compressed.

The image compressing unit 21 is operative to compress a video signal, for example, separated by the Y/C signal processing unit 16 into a brightness signal and a color-difference signal into a predetermined image format, as clearly shown in FIG. 2.

This means that the video signal is shrunken into one-fourth, viz., 240 lines, in the case that the imaging element 12 has 960 effective lines, and the video signal is converted into the NTSC method.

Figure 3:
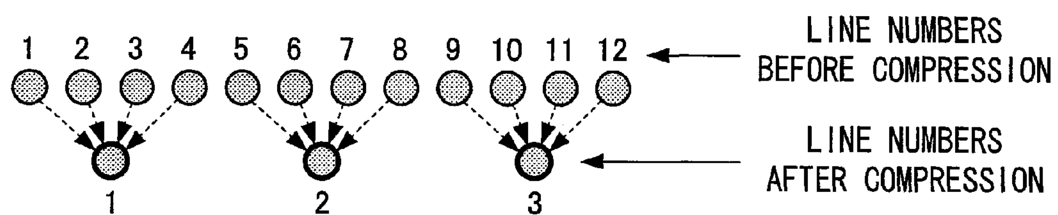
FIG. 3 is a view explaining compressed image data generated as a result of compressing three lines to one line.

The image data after compression, however, tends to be blurred along its contour portions in comparison with the image data before compression, resulting from the fact that the image data each piece constituted by 4 lines is converted into the image data each piece constituted by only one line, as shown in FIG. 3.

In order to prevent the image data from being blurred, the contour correction gain controlling unit 23 is operative to generate a control signal to control the contour correction gain used by the contour correction unit 22 in accordance with the compression ratio of the image data, on the basis of the compression ratio detecting signal s3. In the present embodiment, the control signal outputted from the contour correction unit 22 constitutes a contour correction gain.

Figure 4:
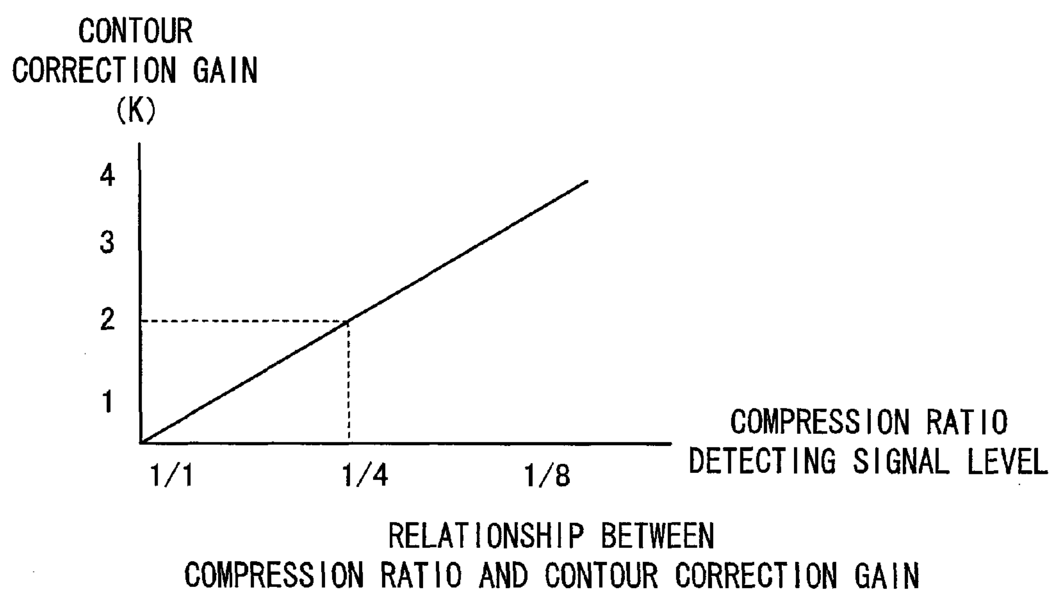
FIG. 4 is a graph explaining a relationship between compression ratio and contour correction gain.

The contour correction gain controlling unit 23 may calculate the contour correction gain in such a manner that the contour correction gain is increased in proportion to the compression ratio, as shown in FIG. 4. This means that the contour correction gain calculated by the contour correction gain controlling unit 23 may be increased to, for example, twice when the compression ratio is increased to one-fourth.

This leads to the fact that the contour correction unit 22 can carry out an appropriate contour correction on the video signal compressed by the image compressing unit 21.

Here, the amount of contour correction carried out by the contour correction unit 22 is represented in accordance with Expression 1 as follows. Here, K is intended to mean the contour correction gain calculated by the contour correction gain controlling unit 23, $Z^{-2}$ is intended to mean the video signal delayed by two lines, and $2Z^{-1}$ is intended to mean the video signal delayed by one line, multiplied by two. This means that the contour correction unit 22 is operative to carry out a contour correction using a digital filter represented by the below-mentioned Expression 1.

Amount of contour correction $Y=K(2Z^{-1}-Z^{-2}-1)$ Expression 1

Figure 5:
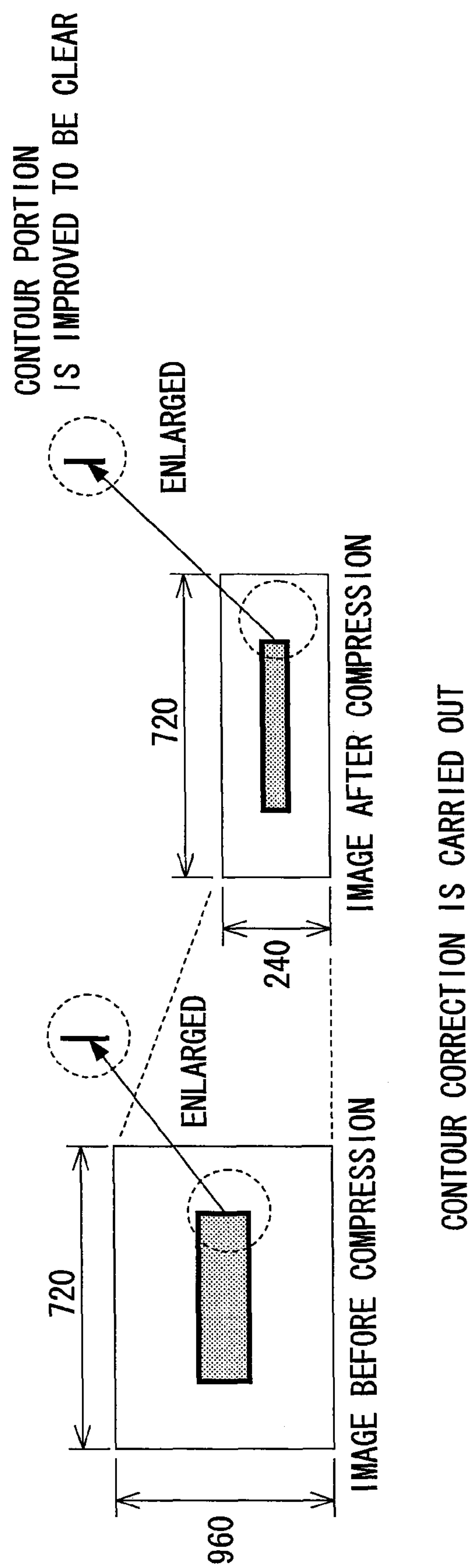
FIG. 5 is a view explaining contour portion of the compressed image data obtained after contour correction.

As will be appreciated from the foregoing description, it is to be understood that the present embodiment of the video signal processing device according to the present invention can appropriately carry out contour correction, resulting from the fact that the amount of contour correction is controlled adaptively in accordance with the compression ratio of the image data. The fact that the contour correction unit 22 can output, as the video signal, image data on which contour correction is appropriately carried out, as shown in FIG. 5, leads to the fact that the NTSC/PAL encoder 24, connected to the contour correction unit 22, can generate and output the analog video signal s1 excellent in the image quality.

Further, the digital outputting unit 25 is operative to generate and output the digital video signal s2, which is not compressed. This means that the digital outputting unit 25 can output, as the digital video signal s2, the image data not deteriorated in resolution, fully utilizing all the number of effective picture elements of the imaging element 12. For example, another contour correction unit for correcting contour for digital image data, is additionally connected with the digital outputting unit 25, image data more sharp-pointed can be obtained. Accordingly, the present embodiment of the video signal processing device can output both analog and digital video signals excellent in the image quality.

Though it has been described in the present embodiment that the amount of contour correction is controlled along a vertical direction, this does not limit the present invention. The amount of contour correction may be controlled along a horizontal direction in the same manner as described in the above.

Further, while it has been described in the present embodiment that the imaging element 12 is driven by the imaging element driving unit 13 by way of interlace method, this does not limit the present invention. It does not need to mention that the imaging element 12 may be driven by the imaging element driving unit 13 by way of progressive method.

Second Preferred Embodiment

Figure 6:
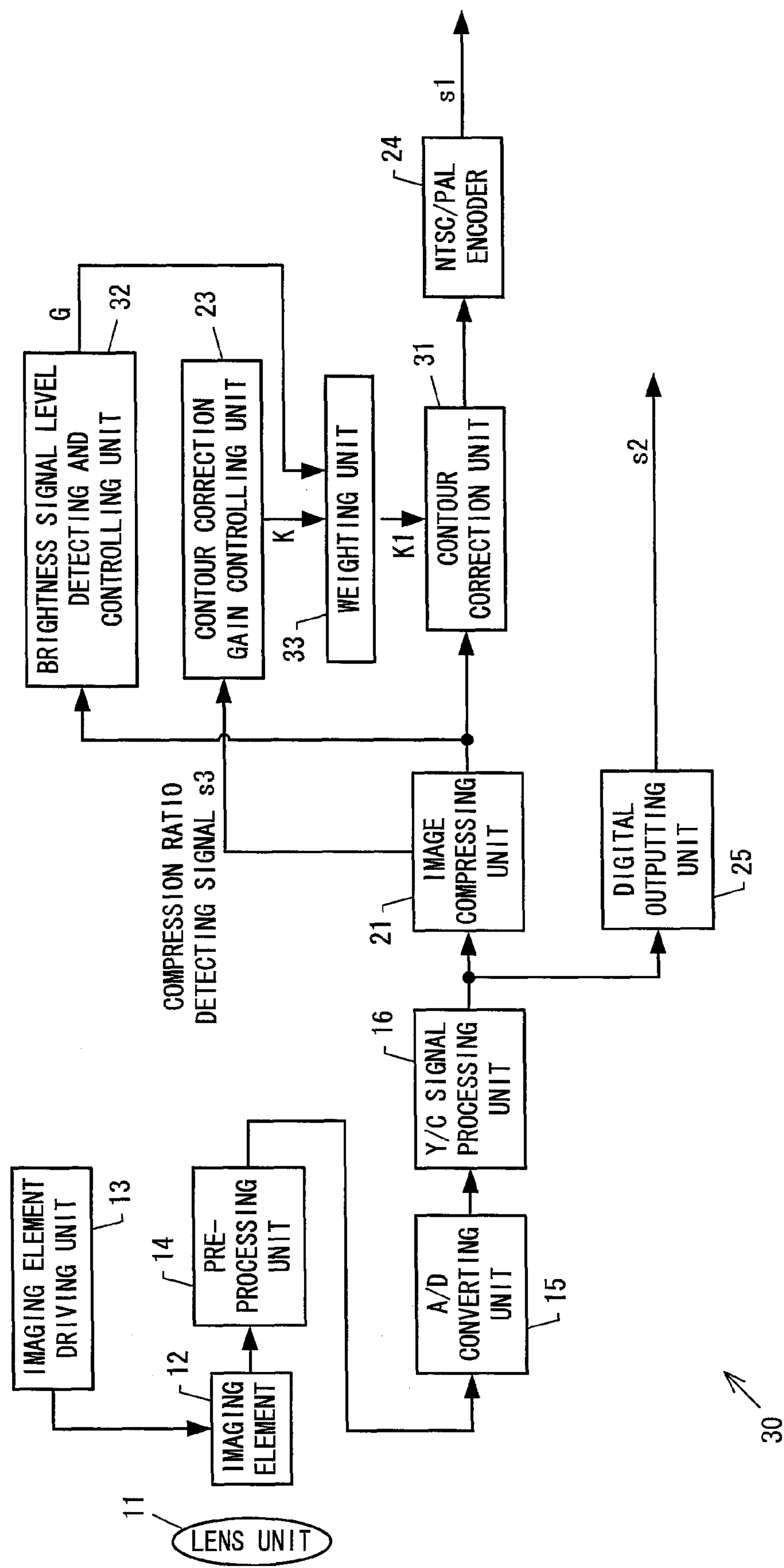
FIG. 6 is a block diagram showing a second preferred embodiment of a video signal processing device according to the present invention.

Then, referring to FIG. 6 of the drawings, there is shown a second preferred embodiment of the video signal processing device according to the present invention.

The constitutional elements of the second embodiment of the video signal processing device 30 according to the present invention the same as those of the first embodiment of the video signal processing device 10 (as shown in FIG. 1) will not be described but bear the same reference numerals and legends as those of the first embodiment of the video signal processing device 10.

As clearly shown in FIG. 6, the present embodiment of the video signal processing device 30 comprises a lens unit 11, an imaging element 12, a imaging element driving unit 13, a pre-processing unit 14, an A/D converting unit 15, a Y/C signal processing unit 16, an image compressing unit 21, a contour correction gain controlling unit 23, an NTSC/PAL encoder 24, a digital outputting unit 25, a contour correction unit 31 for carrying out a contour correction on a video signal, which has been compressed by the image compressing unit 21 into a predetermined image format, a brightness signal level detecting and controlling unit 32 for calculating a brightness level of a video signal outputted from the image compressing unit 21, and controlling an output level, and a weighting unit 33 for calculating and outputting a contour correction gain to be used by the contour correction unit 31.

Here, it is to be noted that the contour correction unit 31 is different from the contour correction unit 22 forming part of the video signal processing device 10 in that the contour correction unit 31 is operative to carry out a contour correction on the video signal outputted from the image compressing unit 21 on the basis of a contour correction gain K1 outputted from the weighting unit 33.

The weighting unit 33 is designed to calculate the contour correction gain K1, to be outputted to the contour correction unit 31, based on a control signal K outputted from the contour correction gain controlling unit 23, and a control signal G outputted from the brightness signal level detecting and controlling unit 32.

Figure 7:
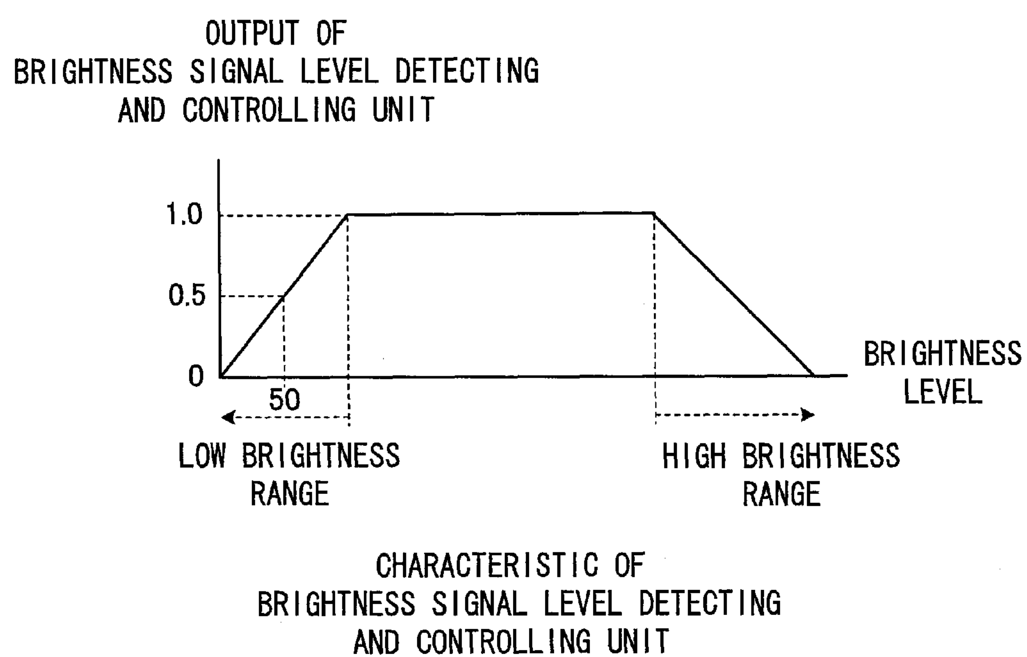
FIG. 7 is a graph explaining a functional characteristic of a brightness signal level detecting and controlling unit.

In the present embodiment, the brightness signal level detecting and controlling unit 32 is operative to calculate the brightness level of the video signal outputted from the image compressing unit 21 to have the output level controlled in such a manner that the output level is increased in proportion to the brightness level when the brightness level is in the range of a low level, the output level maintains the same when the brightness level is in the range of a middle level, and the output level is decreased in inverse proportion to the brightness level when the brightness level is in the range of a high level, as shown in FIG. 7.

Further, the weighting unit 33 is operative to calculate the contour correction gain K1, based on, not only, the control signal K calculated by the contour correction gain controlling unit 23 in response to the compression ratio detecting signal s3, but also the brightness signal level detecting signal G calculated by the brightness signal level detecting and controlling unit 32.

In response to the brightness level of, for example, 50, the brightness signal level detecting and controlling unit 32 is operative to output the brightness signal level detecting signal G of 0.5, as shown in FIG. 7.

Further, in response to the compression ratio of, for example, 1/4, the contour correction gain controlling unit 23 is operative to output the control signal K of 2, as shown in FIG. 4.

The weighting unit 33 is operative to calculate and output the contour correction gain (K1), in response to the control signal (K) outputted from the contour correction gain controlling unit 23 and the brightness signal level detecting signal (G) outputted from the brightness signal level detecting and controlling unit 32, to control the contour correction unit 31.

The weighting unit 33 may calculate the contour correction gain K1, for example, in accordance with Expression 2 as follows.

$$K1=K\times G \qquad \text{Expression 2}$$

Substituting, for example, K=2 and G=0.5 into Expression 2 yields K1=2.0×0.5=1.0. Thus contour correction gain K1 is obtained.

The contour correction gain K1 thus obtained is regarded as a final contour correction gain and then substituted into Expression 1, in place of the contour correction gain K. This means that the amount of contour correction Y is calculated in accordance with Expression 3 as follows.

$$\text{Amount of contour correction } Y=K1(2Z^{-1}=Z^{-2}=1) \qquad \text{Expression 3}$$

As will be appreciated from the foregoing description, it is to be understood that the present embodiment of the video signal processing device according to the present invention can prevent signal-noise ratio from being deteriorated when the brightness level of image data is low, as well as mitigate a feeling of strangeness arisen as a result of carrying out contour correction on image data having few high frequency components when the brightness level of the image data is high resulting from the fact that contour correction can be controlled adaptively in accordance with the change of brightness level and the compression ratio of the image data outputted from the image compressing unit 21. This leads to the fact that the present embodiment of the video signal processing device according to the present invention can appropriately carry out contour correction.

The fact that the contour correction unit 31 can output, as the video signal, image data on which contour correction is appropriately carried out leads to the fact that the NTSC/PAL encoder 24, connected to the contour correction unit 22, can generate and output the analog video signal s1 hardly deteriorated in signal-noise ratio, adaptively corresponding to the change of brightness level and the compression ratio of the image data outputted from the image compressing unit 21.

Further, the digital outputting unit 25 is operative to generate and output the digital video signal s2, which is not compressed. This means that the digital outputting unit 25 can output, as the digital video signal s2, the image data not deteriorated in resolution, fully utilizing all the number of effective picture elements of the imaging element 12.

Accordingly, the present embodiment of the video signal processing device can output both analog and digital video signals excellent in the image quality.

Though it has been described in the present embodiment that the amount of contour correction is controlled along a vertical direction, this does not limit the present invention. The amount of contour correction may be controlled along a horizontal direction in the same manner as described in the above.

Further, while it has been described in the present embodiment that the imaging element 12 is driven by the imaging element driving unit 13 by way of interlace method, this does not limit the present invention. It does not need to mention that the imaging element 12 may be driven by the imaging element driving unit 13 by way of progressive method.

Third Preferred Embodiment

Figure 8:
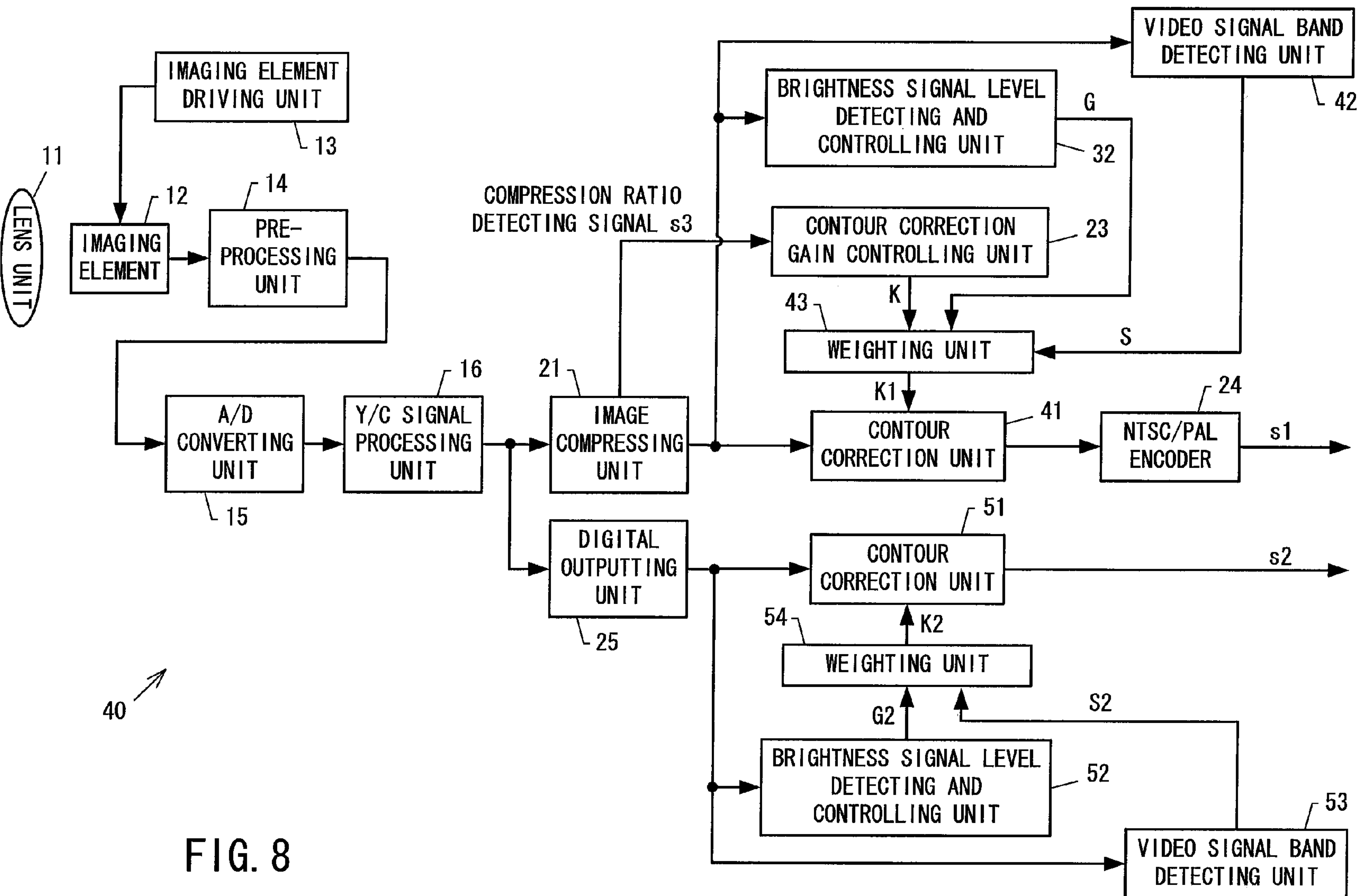
FIG. 8 is a block diagram showing a third preferred embodiment of a video signal processing device according to the present invention.

Then, referring to FIG. 8 of the drawings, there is shown a third preferred embodiment of the video signal processing device according to the present invention.

The constitutional elements of the third embodiment of the video signal processing device 40 according to the present invention the same as those of the second embodiment of the video signal processing device 30 (as shown in FIG. 6) will not be described but bear the same reference numerals and legends as those of the second embodiment of the video signal processing device 30.

As clearly shown in FIG. 8, the present embodiment of the video signal processing device 40 comprises a lens unit 11, an imaging element 12, a imaging element driving unit 13, a pre-processing unit 14, an A/D converting unit 15, a Y/C signal processing unit 16, an image compressing unit 21, a contour correction gain controlling unit 23, an NTSC/PAL encoder 24, a digital outputting unit 25, a brightness signal level detecting and controlling unit 32, a contour correction unit 41 for carrying out a contour correction on a video signal, which has been compressed by the image compressing unit 21 into a predetermined image format, a video signal band detecting unit 42 for detecting frequency components of video signals compressed by the image compressing unit 21, a weighting unit 43 for calculating a contour correction gain to be used by the contour correction unit 41, a contour correction unit 51 for carrying out a contour correction on a video signal outputted from the digital outputting unit 25, a brightness signal level detecting and controlling unit 52 for calculating a brightness level of the video signal outputted from the digital outputting unit 25, and controlling an output level, a video signal band detecting unit 53 for detecting frequency components of the video signals outputted from the digital outputting unit 25, and a weighting unit 54 for calculating and outputting a contour correction gain to be used by the contour correction unit 51.

Here, it is to be noted that the contour correction unit 41 is different from the contour correction unit 31 forming part of the video signal processing device 30 shown in FIG. 6 in that the contour correction unit 41 is operative to carry out a contour correction on the video signal outputted from the image compressing unit 21 on the basis of a contour correction gain K1 outputted from the weighting unit 43.

The weighting unit 43 is designed to calculate the contour correction gain K1, to be outputted to the contour correction unit 41, based on a control signal K outputted from the contour correction gain controlling unit 23, a brightness signal level detecting signal G outputted from the brightness signal level detecting and controlling unit 32, and a control signal S outputted from the video signal band detecting unit 42.

The contour correction unit 51 is designed to carrying out a contour correction on a video signal outputted from the digital outputting unit 25, in accordance with a contour correction gain K2 outputted from the weighting unit 54. The weighting unit 54 is designed to calculate the contour correction gain K2 to be outputted to the contour correction unit 51, based a brightness signal level detecting signal G2 outputted from the brightness signal level detecting and controlling unit 52, and a control signal S2 outputted from the video signal band detecting unit 53.

In the present embodiment, the video signal band detecting unit 42 is designed to detect frequency components of video signals outputted from the image compressing unit 21, and generate and output the control signal S based on the detected frequency components of the video signals. The weighting unit 43 is designed to calculate a contour correction gain K1 based on the control signal S outputted from the video signal band detecting unit 42, in addition to the control signal K outputted from the contour correction gain controlling unit 23, the brightness signal level detecting signal G outputted from the brightness signal level detecting and controlling unit 32.

Figure 9:
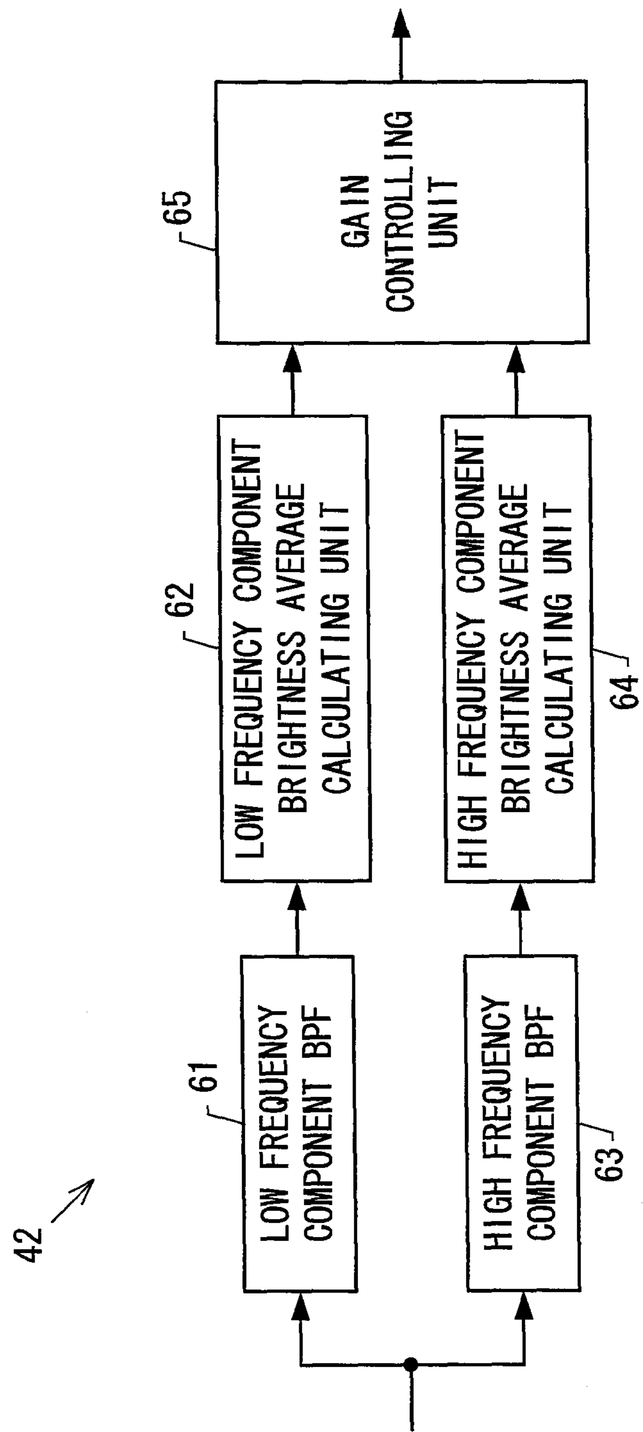
FIG. 9 is a block diagram showing a video signal band detecting unit.

The description hereinlater will be directed to the construction of the video signal band detecting unit 42, with reference to FIG. 9.

The video signal band detecting unit 42 includes a low frequency component BPF (band pass filter) 61 for allowing low frequency components of the image data to be passed therethrough, a low frequency component brightness average calculating unit 62 for calculating a brightness average per one picture element based on the output from the low frequency component BPF 61, a high frequency component BPF (band pass filter) 63 for allowing high frequency components of the image data to be passed therethrough, a high frequency component brightness average calculating unit 64 for calculating a brightness average per one picture element based on the output from the high frequency component BPF 63, and a gain controlling unit 65 for carrying out a gain control based on the outputs from the low frequency component brightness average calculating unit 62 and the high frequency component brightness average calculating unit 64.

Figure 10:
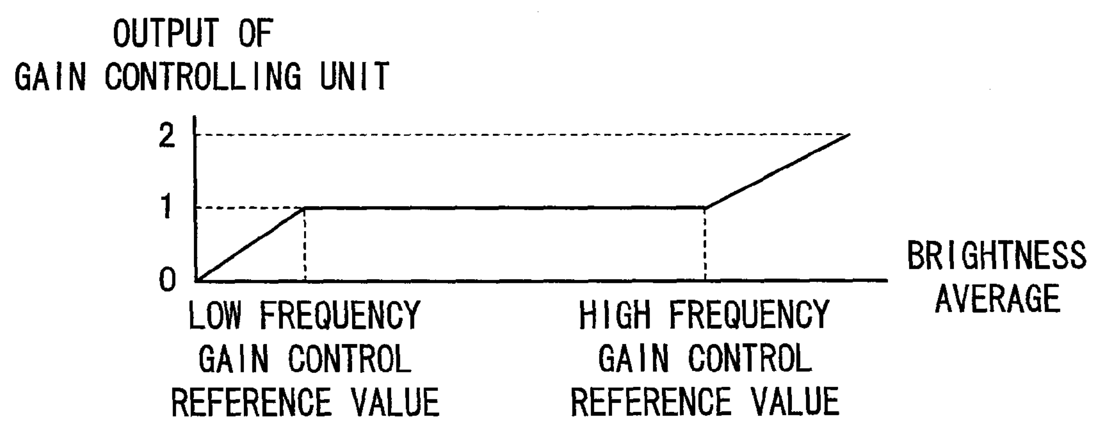
FIG. 10 is a graph explaining an output characteristic of the video signal band detecting unit.

The gain controlling unit 65 is operative to compare the brightness average of the low frequency components outputted from the low frequency component brightness average calculating unit 62 with the brightness average of the high frequency components outputted from the high frequency component brightness average calculating unit 64, as show in FIG. 10.

When it is judged that the brightness average of the low frequency components is greater than the brightness average of the high frequency components, the gain controlling unit 65 is operative to compare the brightness average of the low frequency components with a low frequency gain control reference value. When it is judged that the brightness average of the low frequency components outputted from the low frequency component brightness average calculating unit 62 is lower than the low frequency gain control reference value, the gain controlling unit 65 is operative to judge that the image data includes relatively large amount of smooth picture elements, having low frequency components, and output the control signal S indicative of a smaller value.

When, on the other hand, it is judged that the brightness average of the high frequency components is greater than the brightness average of the low frequency components, the gain controlling unit 65 is operative to compare the brightness average of the high frequency components with a high frequency gain control reference value. When it is judged that the brightness average of the low frequency components outputted from the high frequency component brightness average calculating unit 64 is higher than the high frequency gain control reference value, the gain controlling unit 65 is operative to judge that the image data includes relatively large amount of sharp picture elements, and output the control signal S indicative of a greater value.

Thus, the video signal band detecting unit 42 can generate and output a gain control signal S adaptively in accordance with the band of the video signal.

The weighting unit 43 is operative to calculate the contour correction gain K1, adaptively in accordance with the control signal S outputted from the video signal band detecting unit 42, the brightness signal level detecting signal G outputted from the brightness signal level detecting and controlling unit 32, and the control signal K outputted from the contour correction gain controlling unit 23.

The weighting unit 43 may calculate the contour correction gain K1, for example, in accordance with Expression 4 as follows.

$$K1 = K \times G \times S \quad \text{Expression 4}$$

As will be appreciated from the foregoing description, it is to be understood that the contour correction unit 41 can output the video signal adaptively corresponding to the compression ratio of the image data, the brightness signal level, and the band of the video signal.

This leads to the fact that the NTSC/PAL encoder 24 can generate and output the analog video signal hardly deteriorated in signal-noise ratio, on which contour correction has been appropriately carried out.

Further, in the case that a contour correction is carried out on the video signal outputted from digital outputting unit 25, the contour correction can be controlled adaptively in accordance with the brightness level of the video signal and the band of the video signal in the same manner as described in the above.

The video signal outputted from the digital outputting unit 25 has not been compressed. This means that the digital outputting unit 25 can output the image data not deteriorated in resolution, fully utilizing all of the number of effective picture elements of the imaging element 12.

In the present embodiment, the weighting unit 54 can calculate a contour correction gain K2 to be used by the contour correction unit 51, in the same manner as the weighting unit 43, resulting from the fact that the video signal processing device 40 comprises a brightness signal level detecting and controlling unit 52, the same in function as the brightness signal level detecting and controlling unit 32, for detecting a brightness level of a digital video signal outputted from the digital outputting unit 25, and generating a brightness signal level detecting signal G2, and a video signal band detecting unit 53, the same in function as the video signal band detecting unit 42, for detecting frequency components of the video signals outputted from the digital outputting unit 25, and generating a control signal S2 to be used to control the contour correction gain.

In this case, the weighting unit 54 may calculate the contour correction gain K2 on the basis of the control signal S2 outputted from the video signal band detecting unit 53 and the brightness signal level detecting signal G2 outputted from the brightness signal level detecting and controlling unit 52, for example, in accordance with Expression 5 as follows.

$$K2 = G2 \times S2 \quad \text{Expression 5}$$

The fact that the contour correction unit 51 can output, as the video signal, image data on which contour correction is carried out adaptively corresponding to the brightness level and the band of the video signal leads to the fact that the contour correction unit 51 can generate and output the video signal hardly deteriorated in signal-noise ratio and excellent in the image quality.

Accordingly, the present embodiment of the video signal processing device can output both analog and digital video signals excellent in the image quality.

Though it has been described in the present embodiment that the amount of contour correction is controlled along a vertical direction, this does not limit the present invention. The amount of contour correction may be controlled along a horizontal direction in the same manner as described in the above. In addition, contour correction can be carried out more accurately if the video signal is further divided into a greater number of bands, and controlled for each of the bands by the video signal band detecting unit 42 and/or the video signal band detecting unit 53.

Further, while it has been described in the present embodiment that the imaging element 12 is driven by the imaging element driving unit 13 by way of interlace method, this does not limit the present invention. It does not need to mention that the imaging element 12 may be driven by the imaging element driving unit 13 by way of progressive method.

Fourth Preferred Embodiment

Figure 11:
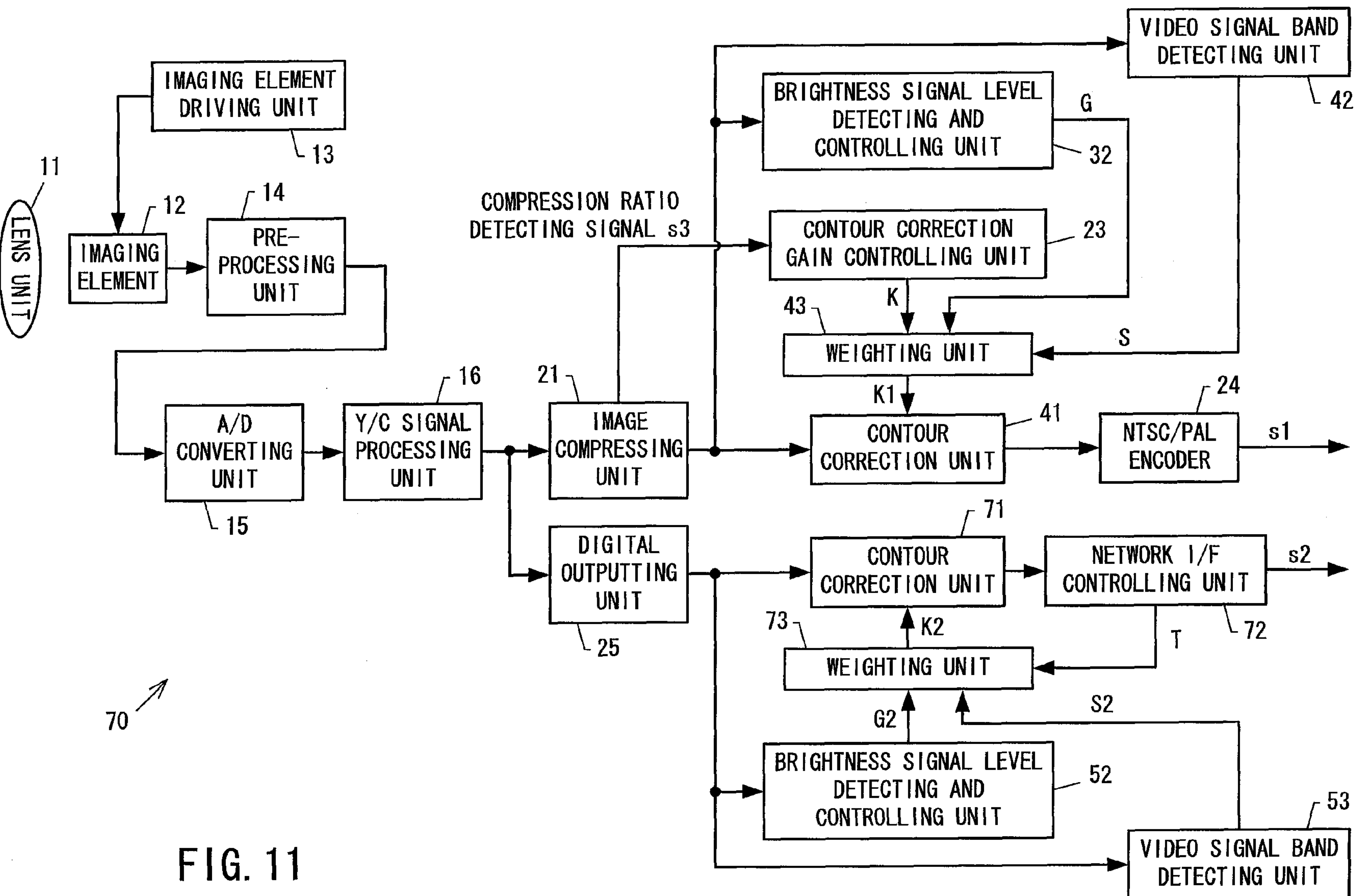
FIG. 11 is a block diagram showing a fourth preferred embodiment of a video signal processing device according to the present invention.

Now, referring to FIG. 11 of the drawings, there is shown a fourth preferred embodiment of the video signal processing device according to the present invention.

The constitutional elements of the fourth embodiment of the video signal processing device 70 according to the present invention the same as those of the third embodiment of the video signal processing device 40 (as shown in FIG. 6) will not be described but bear the same reference numerals and legends as those of the third embodiment of the video signal processing device 40.

As clearly shown in FIG. 11, the present embodiment of the video signal processing device 70 comprises a lens unit 11, an imaging element 12, a imaging element driving unit 13, a pre-processing unit 14, an A/D converting unit 15, a Y/C signal processing unit 16, an image compressing unit 21, a contour correction gain controlling unit 23, an NTSC/PAL encoder 24, a digital outputting unit 25, a brightness signal level detecting and controlling unit 32, a contour correction unit 41, a video signal band detecting unit 42, a weighting unit 43, a brightness signal level detecting and controlling unit 52, a video signal band detecting unit 53, a contour correction unit 71 for carrying out a contour correction on a video signal outputted from the digital outputting unit 25, a network I/F controlling unit 72 for controlling an interface with a network, not shown, adapted to transmit a video signal generated by the video signal processing device 70 to an exterior entity, not shown, to detect a band of the network, and a weighting unit 73 for calculating and outputting a contour correction gain to be used by the contour correction unit 71.

Here, it is to be noted that the contour correction unit 71 is different from the contour correction unit 51 forming part of the video signal processing device 40 shown in FIG. 8 in that the contour correction unit 71 is operative to carry out a contour correction on the basis of a contour correction gain K2 outputted from the weighting unit 73.

The network I/F controlling unit 72 is designed to detect a band of a network, connected therewith, and calculate a control signal T, to be outputted to the weighting unit 73, based on the band of the network. The weighting unit 73 is designed to calculate the contour correction gain K2, to be outputted to the contour correction unit 71, based on a brightness signal level detecting signal G2 outputted from the brightness signal level detecting and controlling unit 52, and a control signal S2 outputted from the video signal band detecting unit 53, and the control signal T outputted from the network I/F controlling unit 72.

In the present embodiment, the network I/F controlling unit 72 is operative to output the control signal T, in accordance with the band of the network, connected therewith, and the weighting unit 73 is operative to calculate the contour correction gain K2 in accordance with the control signal T.

In the case that the bandwidth of the network connected therewith is, for example, approximately 6 Mbps, the network I/F controlling unit 72 is operative to control the contour correction so as to place emphasis on the contour-corrected components in the vicinity of 3 MHz, which corresponds to the middle of the band.

In this case, the weighting unit 73 may calculate the contour correction gain K2 on the basis of the control signal S2 outputted from the video signal band detecting unit 53, the brightness signal level detecting signal G2 outputted from the brightness signal level detecting and controlling unit 52, and the control signal T outputted from the network I/F controlling unit 72, for example, in accordance with Expression 5 as follows.

$$K2=G2\times S2\times T \qquad \text{Expression 6}$$

The fact that the contour correction unit 71 can control contour correction adaptively corresponding to the brightness level, the band, and the network bandwidth leads to the fact that the contour correction unit 71 can generate and output the video signal, on which contour correction has been appropriately carried out and excellent in the image quality.

Accordingly, the network I/F controlling unit 72 can output a video signal, on which contour correction has been appropriately carried out and hardly deteriorated in signal-noise ratio.

Further, the digital outputting unit 25 is operative to generate and output the digital video signal s2, which is not compressed. This leads to the fact that the digital outputting unit 25 can output the image data not deteriorated in resolution, fully utilizing all the number of effective picture elements of the imaging element 12.

Accordingly, the present embodiment of the video signal processing device can output both analog and digital video signals excellent in the image quality.

Though it has been described in the present embodiment that the amount of contour correction is controlled along a vertical direction, this does not limit the present invention. The amount of contour correction may be controlled along a horizontal direction in the same manner as described in the above.

Further, while it has been described in the present embodiment that the imaging element 12 is driven by the imaging element driving unit 13 by way of interlace method, this does not limit the present invention. It does not need to mention that the imaging element 12 may be driven by the imaging element driving unit 13 by way of progressive method.

Fifth Preferred Embodiment

Figure 12:
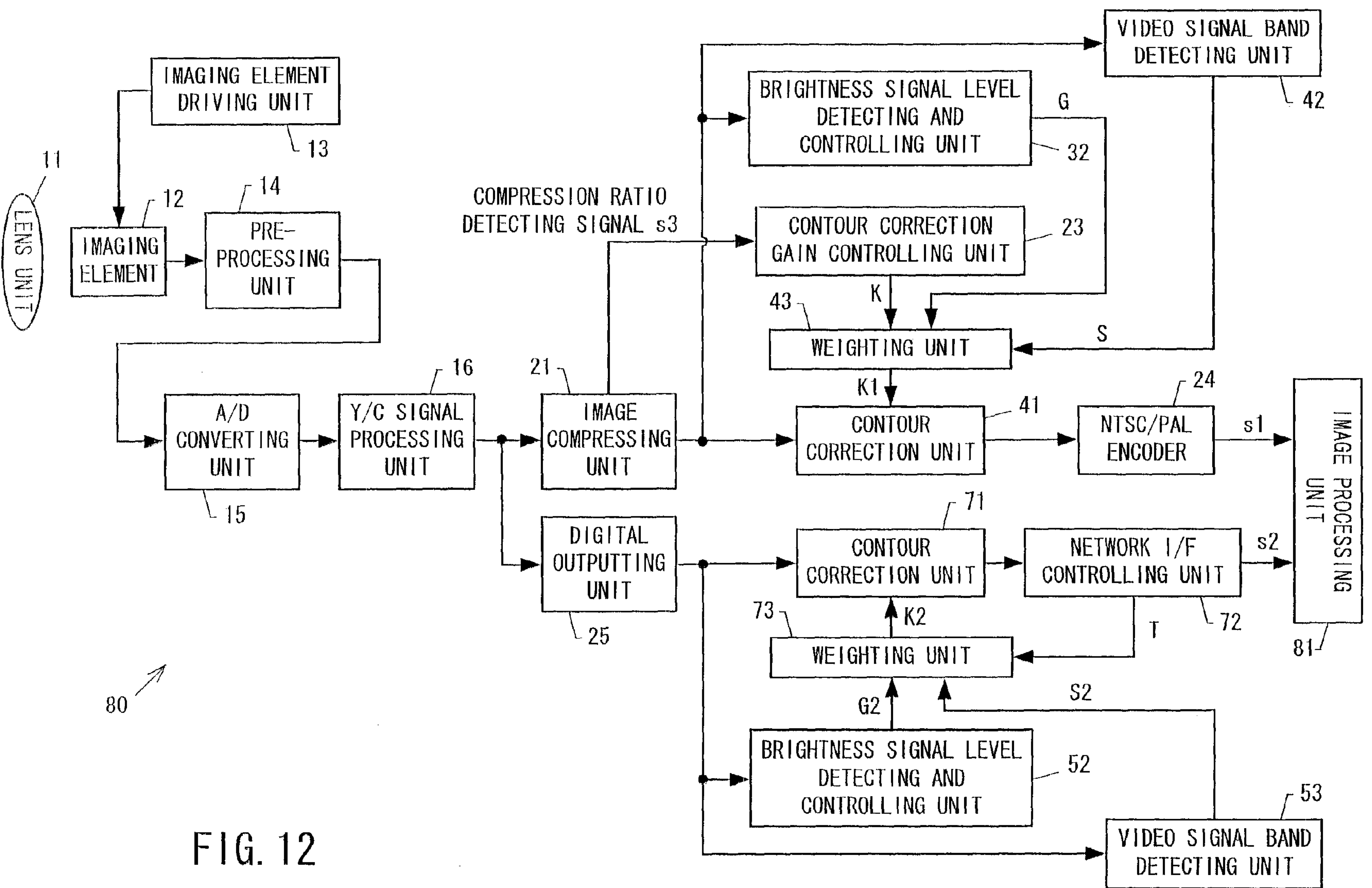
FIG. 12 is a block diagram showing a fourth preferred embodiment of an image signal processing device according to the present invention.
Figure 13:
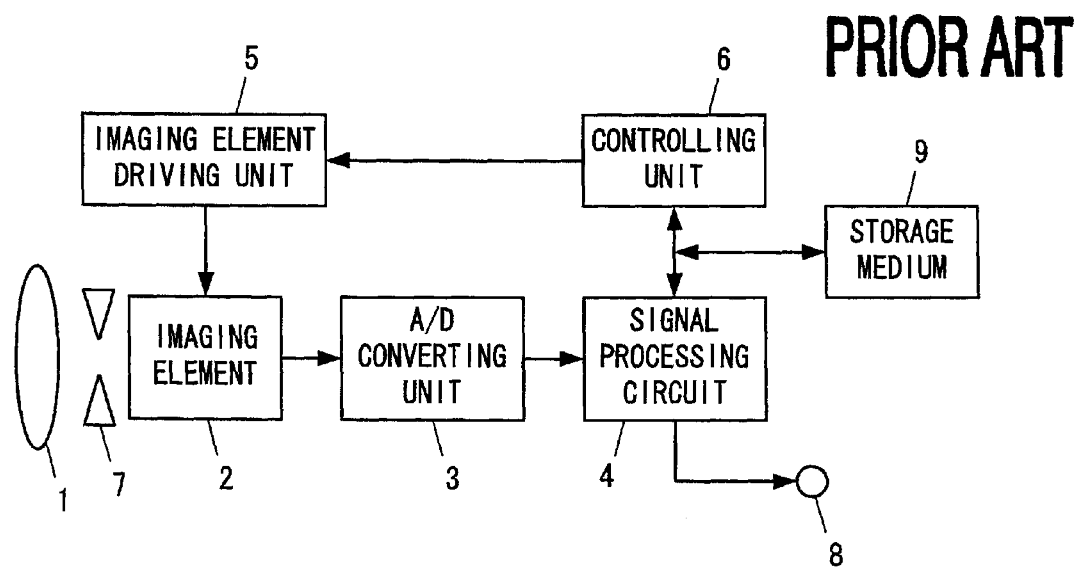
FIG. 13 is a block diagram showing a conventional imaging device.

Referring to FIG. 12 of the drawings, there is shown a fifth preferred embodiment of an image signal processing device according to the present invention.

The constitutional elements of the fifth embodiment of the image signal processing device 80 according to the present invention the same as those of the fourth embodiment of the video signal processing device 70 (as shown in FIG. 11) will not be described but bear the same reference numerals and legends as those of the fourth embodiment of the video signal processing device 70.

As clearly shown in FIG. 12, the present embodiment of the image signal processing device 80 comprises a lens unit 11, an imaging element 12, a imaging element driving unit 13, a pre-processing unit 14, an A/D converting unit 15, a Y/C signal processing unit 16, an image compressing unit 21, a contour correction gain controlling unit 23, an NTSC/PAL encoder 24, a digital outputting unit 25, a brightness signal level detecting and controlling unit 32, a contour correction unit 41, a video signal band detecting unit 42, a weighting unit 43, a brightness signal level detecting and controlling unit 52, a video signal band detecting unit 53, a contour correction unit 71, a network I/F controlling unit 72, a weighting unit 73, and an image processing unit 81 for carrying out an image processing on a video signal outputted from the NTSC/PAL encoder 24 or the network I/F controlling unit 72.

In the present embodiment, it is assumed that the contour correction unit 41 is operative to carry out a contour correction on compressed image data, to be outputted to the NTSC/PAL encoder 24 while, on the other hand, the contour correction unit 71 is operative to carry out a contour correction on uncompressed image data, to be outputted to the network I/F controlling unit 72, in the same manner as described in the previous embodiment.

The image processing unit 81 is operative to carry out an image processing on one of or both of the video signals respectively outputted from the NTSC/PAL encoder 24 and the network I/F controlling unit 72. This leads to the fact that the present embodiment of the image signal processing device 80 can carry out an image processing such as, for example, a person authentication processing of extracting contour components of the image data, with high accuracy.

INDUSTRIAL APPLICABILITY OF THE PRESENT INVENTION

As will be seen from the foregoing description, the video signal processing device according to the present invention has an effect of outputting image data, on which contour correction has been appropriately carried out, fully utilizing all the number of effective picture elements of the imaging element, and excellent in image quality, and is available as a video processing device of converting a video signal into a predetermined image format, and the like.

What is claimed is:

1. A video signal processing device, comprising:

image data generating means for converting a video signal inputted from an imaging element into image data based on effective pixels contained in said video signal;

image compression means for compressing said image data at a predetermined compression ratio;

contour correction means for carrying out a contour correction on said image data compressed by said image compression means in accordance with a contour correction gain to output a corrected video signal;

contour correction gain calculating means for calculating said contour correction gain based on said compression ratio at which said image compression means compresses said image data and frequency components of said compressed image data; and image frequency component detecting means for detecting said frequency components of said compressed said image, comprising:

a low frequency brightness average calculating unit for calculating a low frequency brightness average of said compressed image data, a high frequency brightness average calculating unit for calculating a high frequency brightness average of said compressed image data, and a gain control signal generating unit for comparing said low frequency brightness average calculated by said low frequency brightness average calculating unit and said high frequency brightness average calculated by said high frequency brightness average calculating unit, generating a gain control signal used to decrease said contour correction gain when it is judged that said low frequency brightness average is greater than said high frequency brightness average but lower than a predetermined low frequency brightness reference value, generating a gain control signal used to increase said contour correction gain when it is judged that said high frequency brightness average is greater than both said low frequency brightness average and greater than a predetermined high frequency brightness reference value, and outputting said gain control signal to said contour correction gain calculating means.

2. A video signal processing device as set forth in claim 1, which further comprises:

brightness signal level detecting means for detecting a brightness signal level of said image data compressed by said image compression means, and in which said contour correction gain calculating means is operative to calculate said contour correction gain based on said brightness signal level detected by said brightness signal level detecting means, in addition to said compression ratio at which said image compression means compresses said image data and said frequency components of said compressed image data.

3. A video signal processing device as set forth in claim 1, which further comprises:

digital network band detecting means for detecting a band of a network, which transmits said corrected video signal, and in which said contour correction gain calculating means is operative to calculate said contour correction gain on the basis of said band of said network detected by said network band detecting means, in addition to said compression ratio at which said image compression means compressed said image data.

4. A video signal processing device as set forth in claim 1, which further comprises a digital image outputting unit for outputting said image data generated by said image data generating means.

5. A video signal processing device as set forth in claim 4, which further comprises:

digital brightness signal level detecting means for detecting a brightness signal level of said image data outputted from said digital image outputting unit, digital contour correction means for carrying out a contour correction on said image data outputted from said digital image outputting unit in accordance with a contour correction gain, to output a corrected video signal; and digital contour correction gain calculating means for calculating said contour correction gain on the basis of said brightness signal level calculated by said digital brightness signal level detecting means.

6. A video signal processing device as set forth in claim 5, which further comprises:

digital image frequency component detecting means for detecting frequency components of said image data outputted from said digital image outputting unit, and in which said digital contour correction gain calculating means is operative to calculate said contour correction gain on the basis of said frequency components of said image data detected by said digital image frequency component detecting means, in addition to said brightness signal level calculated by said digital brightness signal level detecting means.

7. A video signal processing device as set forth in claim 5, which further comprises:

digital network band detecting means for detecting a band of a network, which transmits said corrected video signal, said contour correction gain calculating means is operative to calculate said contour correction gain on the basis of said band of said network detected by said network band detecting means, in addition to said brightness signal level calculated by said digital brightness signal level detecting means.

8. An image processing device, comprising:

a video signal processing device as set forth in claim 1, and image processing means for carrying out an image processing based on said video signal generated by said video signal processing device.

* * * * *